United States Patent Office 3,637,845
Patented Jan. 25, 1972

3,637,845
FLUOROALKANESULFONAMIDES
George G. I. Moore, White Bear Lake, and Alvin C. Conway, North St. Paul, Minn., assignors to Minnesota Mining and Manufacturing Company, St. Paul, Minn.
No Drawing. Filed Apr. 14, 1969, Ser. No. 816,041
Int. Cl. C07c 143/74
U.S. Cl. 260—556 F    6 Claims

ABSTRACT OF THE DISCLOSURE

This invention relates to certain N-acylfluoroalkanesulfonamides which are active anticonvulsants. Processes for the preparation of the compounds are described.

BACKGROUND OF THE INVENTION

Field of the invention

This invention relates to N-acylfluoroalkanesulfonamides, and to compounds physiologically active as anticonvulsant agents.

Prior art

N-substituted fluoroalkanesulfonamides are known to the art. Compounds in which the sulfonamido nitrogen substituent is an acyl group are not widely known. U.S. Pat. 2,995,542 describes a group of polymerizable monomers which do contain a carbonyl carbon atom bonded to the nitrogen atom of a perfluoroalkanesulfonamido group. An essential feature of the compounds of that patent is a perfluoroalkane group of four to eighteen carbon atoms, and these compounds have useful hydrophobic and oleophobic properties.

DETAILED DESCRIPTION OF THE INVENTION

This invention relates to compounds having the formula:

$$R-\overset{O}{\underset{}{C}}-\underset{R'}{N}-SO_2R_f \qquad \text{Formula I}$$

wherein $R_f$ is a fluoroalkane radical of one or two carbon atoms having at least two fluorine atoms attached to the alpha carbon atom of the radical or at least three fluorine atoms attached to carbon atoms of the radical in other configurations, R' is hydrogen, a pharmaceutically acceptable cation or a lower alkyl or lower alkenyl radical, and R is a straight or branched chain or cyclic alkyl or alkenyl radical having 1 to 12 carbon atoms, optionally substituted by halogen, alkoxy, carboxylic acid ester, phenyl, halophenyl or biphenyl groups.

The compounds of the present invention are novel anticonvulsant agents. An essential feature of these compounds is a fluoroalkane chain of one or two carbon atoms. Indeed, the anticonvulsant activity of the compounds of the present invention is maximal when the fluoroalkane group is trifluoromethyl, and decreases rapidly when additional carbon atoms are added to the chain or fluorine atoms are replaced by hydrogen. Thus, difluoromethane, perfluoroethane, 2,2,2-trifluoroethane and 2-hydroperfluoroethane derivatives are less active as anticonvulsant agents, and perfluorobutane and fluoromethane derivatives are essentially inactive.

Preferred compounds of the invention are those wherein $R_f$ is trifluoromethyl, since these compounds generally show superior anticonvulsant activity.

The amido nitrogen of the compounds of Formula I wherein R' is H bears a hydrogen atom which is relatively acidic. It may be replaced by metal ions by neutralization with a salt of a weak acid to form compounds wherein R' is a cation. Suitable metal ions which may be utilized are preferably those which are pharmaceutically acceptable, for example, sodium and potassium, when the compounds of the invention are to be used as anticonvulsants. Other pharmaceutically acceptable cations, which are well known to the art, such as triethylammonium, may also be included in salts of the compounds of the invention.

The compounds of the invention are prepared conveniently by the reaction of an acyl halide with a fluoroalkanesulfonamide or its salt as shown in the following equation:

$$R-\overset{O}{\underset{}{C}}X + M\underset{R'}{N}SO_2R_f \longrightarrow R-\overset{O}{\underset{}{C}}-\underset{R'}{N}SO_2R_f + MX$$

Formula II    Formula III    Equation I

In this equation R, R' and $R_f$ are as defined above, M is hydrogen (preferably) or a metal ion (preferably an alkali metal) and X is halogen, preferably chlorine, since the acyl chlorides are generally more conveniently available. Acyl anhydrides may be used in place of acyl halides although they are not generally preferred.

The starting materials of Formula II and Formula III are known to the art or are readily prepared using known techniques.

It is preferred that the reaction be run in the presence of base, although base is not necessary, and a non-reactive solvent is preferred. Generally this solvent has been acetone, benzene or dichloromethane, but other solvents including alkyl ketones, esters, mono- and diglyme, alkanes, chlorinated hydrocarbons and the like can be used. It is preferred that these solvents dissolve most of the reactants to facilitate homogeneous reaction. Bases which are suitable include salts of weak acids such as sodium acetate and sodium carbonate and organic tertiary amines such as triethylamine and N,N-dimethylaniline. A volatile organic base such as triethylamine is preferred. The reaction is preferably run under anhydrous conditions, and when very reactive acyl halides are used, under an atmospheres of a dry, relatively inert gas, such as nitrogen. Other equivalent anhydrous conditions are apparent to one skilled in the art.

The reaction between the acyl halide and the fluoroalkanesulfonamide is generally quite rapid at room temperature, although stirring is continued for up to several hours in order to insure completion of the reaction. Refluxing and/or extended reaction periods may be useful to obtain reaction of relatively unreactive pairs of reactants.

These reactions may also be run in high pressure reactors, without solvent.

An alternative route to some of the compounds of this invention is available. This consists of the reaction of an amide, or its salt, with a fluoroalkanesulfonyl halide, as shown in the following equation:

$$R-\overset{O}{\underset{}{C}}-\underset{R'}{N}M + R_fSO_2X \longrightarrow R-\overset{O}{\underset{}{C}}-\underset{R'}{N}-SO_2R_f + MX$$

Equation II

In this equation, R, R', $R_f$, M and X are as defined above. However, this route is generally not preferred.

The compounds of the invention are solid materials which in salt form are water-soluble; when not in salt form the compounds are soluble in lower alcohols, glycols and the like.

For general use as anticovulsants, the compounds of the present invention are preferably administered orally. Some of the compounds of this invention are salts or will form salts. For oral administration, they will preferably be administered as salts of pharmaceutically acceptable cations, as are well known to the art, and particularly as sodium salts. The compounds of the invention are active as anticonvulsants, although it will be appreciated that some are more active than others.

The compounds of the invention are especially advantageous because the duration of their effect is quite long. This permits longer intervals between doses, with no reduction in effectiveness. Alternatively, the repeated administration of lower, acutely subeffective dosages has been demonstrated to result in ultimate complete effectiveness. Thus, subeffective dosages have a cumlative effect.

The amounts of the compounds of Formula I which are to be administered will depend on several factors such as the weight of the warm-blooded animal recipient and the route of administration employed. The compounds of this invention are generally effective in doses of 0.1 to 20 milligrams per kilogram daily. The amounts can be given in single or multiple doses, as required. The particular dosage for any given situation will be apparent to one skilled in the art.

The compounds of Formula I or their pharmaceutically acceptable salts can be suitably formulated in physiologically acceptable solutions and carriers to make tablets, syrups, isotonic solutions, injectable solutions, suppositories and other dosage forms.

In order to examine the efficacy of the compounds of the present invention in the prevention or reduction in severity of convulsive seizures, they were tested by two methods, electro-shock and chemically-induced shock. More specifically, antagonism of corneal supramaximal electroshock and 1,5 - pentamethylenetetrazole - induced seizures were used as test methods.

The supramaximal electroshock technique is described in detail by Toman et al., Journal of Neurophysiology 9:231, (1946).

In order to obtain a correlation of the effectiveness of the protection with the lethal hazard, the dose ($ED_{50}$) that protects 50 percent of the animals at the time of peak antishock effect is calculated, and is compared to the median lethal dose, $LD_{50}$. A therapeutic index $$(T.I.=LD_{50}/ED_{50})$$

is calculated. The therapeutic index of a number of the compounds of this invention has been found to be greater than 5.

The production of 1,5-pentamethylenetetrazole-induced seizure is described in detail by Everett and Richards, Journal of Pharmacology and Experimental Therapeutics 81, 402 (1944).

The preferred compounds of the invention with respect to anticonvulsant activity include:

N-phenylacetyltrifluoromethanesulfonamide
N-(α-chlorophenylacetyl)trifluoromethanesulfonamide
N-cinnamoyltrifluoromethanesulfonamide
N-(3-phenylpropionyl)trifluoromethanesulfonamide
N-n-butyryltrifluoromethanesulfonamide
N-n-heptanoyltrifluoromethanesulfonamide
N-n-dodecanyoltrifluoromethanesulfonamide
N-(cyclopentanecarbonyl)trifluoromethanesulfonamide
N-(chloroacetyl)trifluoromethanesulfonamide
N-(dichloroacetyl)trifluoromethanesulfonamide
N-(trichloroacetyl)trifluoromethanesulfonamide
N-(3-chloropropionyl)trifluoromethanesulfonamide
N-methoxyacetyltrifluoromethanesulfonamide
N-(cyclobutanecarbonyl)trifluoromethanesulfonamide and
N-(cyclohexanecarbonyl)trifluoromethanesulfonamide
and the sodium salts of the above compounds; and
N-phenylacetyl-N-methyltrifluoromethanesulfonamide Certain compounds of this invention also show activity as diuretics, herbicides, plant growth modifiers, insecticides and antimicrobial agents. The herbicidal and plant growth modifying activity was determined using screening tests against experimental plantings.

The activity of these compounds is theorized to be the result of inhibition of the enzyme carbonic anhydrase. This theory is supported by positive results in a standard in vitro assay. Thus, some of the compounds of the invention can be expected to be useful in a fashion similar to known carbonic anhydrase inhibitors, for example, as diuretics, anti-glaucoma agents and in the facilitation of acclimatization to higher altitudes. Certain plant growth modifiers are known to be effective inhibitors of plant carbonic anhydrase.

In order to further illustrate the invention the following non-limiting examples are provided. Melting points are uncorrected.

EXAMPLE 1

Preparation of N-acylfluoroalkanesulfonamides by the method of Equation I: general procedure when R'=H in Formula I.

A mixture of fluoroalkanesulfonamide (0.1 mole), sodium carbonate (0.2 mole) and acetone (about 200 ml.) is stirred one or more hours under a nitrogen atmosphere. The acid chloride (0.1 mole) diluted with a small amount of acetone is added over one or more hours. A mild exotherm is sometimes observed. The reaction mixture is stirred under nitrogen for one or more hours, the mixture is filtered and the acetone is removed in vacuo. The product is a sodium salt, usually solid but sometimes a sticky gum, of the corresponding compound of Formula I. Dissolution in water, treatment with decolorizing charcoal and filtration may be used to purify the product. The product is reisolated by evaporation as the sodium salt, or acidification of the filtrate may be used to obtain the product compound of Formula I. Some of these products have an appreciable water solubility. Recrystallization of compounds of Formula I is usually carried out from trichloroethylene or mixtures of aromatic and aliphatic hydrocarbons such as benzene-hexane. Sublimation may also be used as a purification technique. The sodium salts of these compounds can be recrystallized from nitromethane.

EXAMPLE 2

To the sodium salt of trifluoromethanesulfonamide (8.56 g., 50 mmole) and sodium carbonate (10.6 g., 0.10 mole) in 150 ml. acetone under a nitrogen atmosphere is added dropwise 7.73 g., (50 mmole) of phenylacetyl chloride. The reaction is stirred for two days, filtered and evaporated in vacuo to yield an oil. The oil is dissolved in ethyl ether, then the ether is evaporated in vacuo. The solid product is repeatedly recrystallized from nitromethane with treatment with charcoal to yield analytically pure sodium N-(phenylacetyl)trifluoromethanesulfonamide, M.P. 204–205.5° C.

*Analysis.*—Calculated for $C_9H_7F_3NNaO_3S$ (percent): C, 37.4; H, 2.4. Found (percent): C, 37.6; H, 2.7.

EXAMPLE 3

A mixture of trifluoromethanesulfonamide (14.9 g., 0.10 mole), sodium carbonate (31.8 g., 0.3 mole) and acetone (300 ml.) is stirred for two hours. Heptanoyl chloride (14.9 g., 0.10 mole) is added over forty-five minutes and the reaction is stirred overnight. The reaction mixture is filtered, then acetone is removed in vacuo. Benzene is added and the solvent is again evaporated in vacuo. Ice water is added and the solution is acidified. The white product is collected by filtration and dried, then recrystallized from trichloroethylene to give white needles of N-n-heptanoyltrifluoromethanesulfonamide, M.P. 95–96.5° C.

*Analysis.*—Calculated for $C_8H_{14}F_3NO_3S$ (percent): C, 36.8; H, 5.4; N, 5.4. Found (percent): C, 37.1; H, 5.2; N, 5.2.

The following compounds are prepared according to the procedure of Example 1:

| Example No. | Compound | Melting point (in ° C.) |
|---|---|---|
| 4 | N-(α-chlorophenylacetyl)trifluoromethanesulfonamide. | 65.5-67 |
| 5 | Sodium N-α-chlorophenylacetyltrifluoromethanesulfonamide. | 170-171 d. |
| 6 | N-cinnamoyltrifluoromethanesulfonamide. | 65-67 |
| 7 | N-(1-adamantoyl)trifluoromethanesulfonamide. | 138.5-139.5 |
| 8 | N-(3-carbomethoxypropionyl)trifluoromethanesulfonamide. | 98-100 |
| 9 | N-n-butyryltrifluoromethanesulfonamide. | 100.5-103 |
| 10 | N-n-heptanoyldifluoromethanesulfonamide. | 64-66 |
| 11 | N-n-dodecanoyltrifluoromethanesulfonamide. | 91-92 |
| 12 | N-(cyclopentanecarbonyl)trifluoromethanesulfonamide. | 127.5-129.5 |
| 13 | N-(chloroacetyl)trifluoromethanesulfonamide. | 124.5-127 |
| 14 | N-(dichloroacetyl)trifluoromethanesulfonamide. | 100.5-104.5 |
| 15 | N-(trichloroacetyl)trifluoromethanesulfonamide. | 110-111 |
| 16 | N-(3-chloropropionyl)trifluoromethanesulfonamide. | 97.5-99.5 |
| 17 | N-(methoxyacetyl)trifluoromethanesulfonamide. | 122.5-124 |
| 18 | N-(cyclobutanecarbonyl)trifluoromethanesulfonamide. | 118-120 |
| 19 | N-(cyclohexanecarbonyl)trifluoromethanesulfonamide. | 113.5-115 |
| 20 | N-(3-phenylpropionyl)trifluoromethanesulfonamide. | 86.5-88.5 |
| 21 | N-(2-propylvaleryl)trifluoromethanesulfonamide. | 82.5-84.5 |
| 22 | N-trimethylacetyltrifluoromethanesulfonamide. | 107-110 |
| 23 | N-(p-biphenylacetyl)trifluoromethanesulfonamide. | 153.5-155 |
| 24 | N-(2-phenyl-n-butyryl)trifluoromethanesulfonamide. | 98.5-100.5 |
| 25 | Sodium N-acetyltrifluoromethanesulfonamide. | 266-267.5 d. |
| 26 | N-acryloyltrifluoromethanesulfonamide. | 102-109 |

The compounds of the invention wherein R' is an alkyl or alkenyl radical are preferably prepared by a slightly modified general procedure.

EXAMPLE 27

General procedure

A mixture of acyl halide (0.1 mole) and substituted (N-alkyl or N-alkenyl)fluoroalkanesulfonamide (0.1 mole) in a solvent (about 300 ml.), usually benzene or dichloromethane, is stirred and triethylamine (0.12 mole) is added. Stirring while cooling or refluxing or at room temperature for one or more hours is followed by washing with successive 300 ml. portions of water, 5% sodium hydroxide, 5% hydrochloric acid and water. The organic layer is dried over magnesium sulfate, then the solvent is removed in vacuo. The product is distilled under vacuum if a liquid or recrystallized if a solid, usually from mixtures of aromatic and aliphatic hydrocarbons such as benzenehexane.

The N-alkyl- or N-alkenyltrifluoromethanesulfonamides used as intermediates are prepared by methods known to the art. The preparation of such intermediates is illustrated in the following example.

EXAMPLE 28

Dichloromethane (300 ml.) and n-propylamine (76 g., 0.5 mole) in a one liter flask are cooled using an ice-salt bath and stirred vigorously, and trifluoromethanesulfonyl fluoride (slight excess) is charged slowly above the solution. After the completion of the addition, the reaction is stirred for one hour, then allowed to warm to room temperature. The reaction mixture is washed with 10% hydrochloric acid (150 ml.). The dichloromethane layer is dried over magnesium sulfate, filtered and the solvent evaporated in vacuo. The N-(n-propyl) trifluoromethane sulfonamide is distilled, B.P. 98–100° C./20 mm.

*Analysis.*—Calculated for $C_4H_8F_3NO_2S$ (percent): C, 25.2; H, 4.2. Found (percent): C, 25.2; H, 4.3.

The following compounds are prepared according to the procedure of Example 28.

N-(n-butyl)trifluoromethanesulfonamide, B.P. 94° C./9 mm.

N-methyltrifluoromethanesulfonamide, B.P. 84–85° C./20 mm.

N-ethyltrifluoromethanesulfonamide, B.P. 78° C./15 mm.

N-cyclopropyltrifluoromethanesulfonamide, B.P. 111° C./35 mm.

N-isopropyltrifluoromethanesulfonamide, B.P. 94–98° C./20 mm.

N-allyltrifluoromethanesulfonamide, B.P. 50° C./0.2 mm.

The following compounds are prepared according to the procedure of Example 27.

| Example No. | Compound | Melting point (in ° C.) Boiling point (in ° C./mm.) |
|---|---|---|
| 29 | N-heptanoyl-N-methyltrifluoromethanesulfonamide. | 58/0.25 |
| 30 | N-cyclopentanecarbonyl-N-methyltrifluoromethanesulfonamide. | 41/0.10 |
| 31 | N-(3-phenylpropionyl)-N-methyltrifluoromethanesulfonamide. | 31.5-32.5 |
| 32 | N-(2-phenyl-n-butyryl)-N-methyltrifluoromethanesulfonamide. | 108/0.7 |
| 33 | N-bis(4-chlorophenyl)acetyl-N-methyltrifluoromethanesulfonamide. | 98-99.5 |
| 34 | N-phenylacetyl-N-methyltrifluoromethanesulfonamide. | 67.5-69.5 |

What is claimed is:

1. A compound of the formula

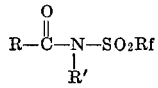

Formula I wherein $R_f$ is a fluoroalkane radical of the group consisting of trifluoromethyl, difluoromethyl, perfluoroethyl, 2,2,2-trifluoroethyl and 2-hydroperfluoroethyl, R' is hydrogen or lower alkyl, and R is a straight or branched chain or cyclic alkyl or alkenyl radical having 1 to 12 carbon atoms, or an alkyl or alkenyl group having 1 to 4 carbon atoms substituted by a methoxy, a phenyl, one or two chlorophenyl, a biphenyl, a carbomethoxy, one to three halogen, or a phenyl and a chloro substituent, and, when R' is hydrogen, pharmaceutically acceptable salts thereof.

2. A compound according to claim 1 wherein $R_f$ is trifluoromethyl.

3. A compound according to claim 1 wherein R is a straight or branched chain alkyl having 1 to 12 carbon atoms, cyclic alkyl of 4 to 6 carbon atoms, chloroalkyl of 1 to 3 carbon atoms, adamantyl, vinyl, cinnamyl, mono- or diphenylmethyl, mono- or dichlorophenylmethyl, phenylchloromethyl, phenyl lower alkyl, methoxymethyl or carboxymethyl lower alkyl, and, when R' is hydrogen, the sodium, potassium or triethylammonium salts thereof.

4. Sodium N-phenylacetyltrifluoromethanesulfonamide.

5. N - (α - chlorophenylacetyltrifluoromethanesulfonamide.

6. N-cinnamoyltrifluoromethanesulfonamide.

References Cited

UNITED STATES PATENTS 2,075,359  3/1937  Salzberg et al. _____ 424—250
2,995,542  8/1961  Brown _____ 260—556 F HENRY R. JILES, Primary Examiner S. D. WINTERS, Assistant Examiner U.S. Cl. X.R.

260—556 AC, 481 R, 543 R; 71—103; 424—321